US012064891B2

(12) United States Patent
Greeb

(10) Patent No.: US 12,064,891 B2
(45) Date of Patent: Aug. 20, 2024

(54) SLICING MACHINE

(71) Applicant: MULTIVAC SEPP HAGGENMUELLER SE & CO. KG, Wolfertschwenden (DE)

(72) Inventor: Timo Greeb, Dillenburg (DE)

(73) Assignee: MULTIVAC Sepp Haggenmueller SE & Co. KG, Wolfertschwenden (DE)

( * ) Notice: Subject to any disclaimer, the term of this patent is extended or adjusted under 35 U.S.C. 154(b) by 191 days.

(21) Appl. No.: 17/585,847

(22) Filed: Jan. 27, 2022

(65) Prior Publication Data

US 2022/0234235 A1 Jul. 28, 2022

(30) Foreign Application Priority Data

Jan. 27, 2021 (DE) ......................... 102021101713.0

(51) Int. Cl.
*B26D 7/01* (2006.01)
*B26D 7/32* (2006.01)

(52) U.S. Cl.
CPC ................. *B26D 7/01* (2013.01); *B26D 7/32* (2013.01); *B26D 2007/011* (2013.01); *B26D 2007/013* (2013.01); *B26D 2210/02* (2013.01)

(58) Field of Classification Search
CPC .......... B26D 2007/011; B26D 2210/02; B26D 2210/08; B26D 7/01; B26D 7/0608; B26D 7/0625; B26D 7/0633; B26D 7/32; Y10S 83/932; A22C 17/0033; B26B 2007/013
USPC ........................................................... 83/932
See application file for complete search history.

(56) References Cited

U.S. PATENT DOCUMENTS

2007/0214969 A1* 9/2007 Mueller .................. B26D 7/01 99/485
2012/0042757 A1* 2/2012 Weber .................... B26D 7/325 83/78

FOREIGN PATENT DOCUMENTS

DE 10 2010 034 677 A1 2/2012
EP 0 547 389 * 6/1993 ........... B26D 7/0683

OTHER PUBLICATIONS

German Search Report Dated Dec. 2, 2021, Application No. 10 2021 101 713.0, Applicant MULTIVAC Sepp Haggenmueller SE & Co. KG, 6 Pages.

* cited by examiner

*Primary Examiner* — Evan H MacFarlane
(74) *Attorney, Agent, or Firm* — Brooks Kushman P.C.

(57) ABSTRACT

As a fast and compact slide drive for a gripper slide, a traversing unit such as a traversing traction element unit is provided.

4 Claims, 10 Drawing Sheets

SLICING MACHINE

CROSS-REFERENCE TO RELATED APPLICATION

This application claims priority to German Patent Application No. DE 102021101713.0 filed on Jan. 27, 2021, the disclosure of which is incorporated in its entirety by reference herein.

TECHNICAL FIELD

The invention relates to slicing machines, in particular so-called slicers, which are used in the food industry to cut strands of an only slightly compressible product such as sausage or cheese into slices.

BACKGROUND

Since these strands can be produced with a cross section that retains its shape and dimensions well over its length, i.e., essentially constant, they are called product calibers.

In most cases, several product calibers arranged parallel to each other are cut at the same time by cutting one slice at a time by the same blade, which moves in a transverse direction to the longitudinal direction of the product calibers.

The product calibers are pushed forward by a feed conveyor of a cutting unit in the direction to the blade of the cutting unit, usually on an obliquely downwardly directed feed conveyor, and are each guided through the product openings of a plate-shaped cutting frame, at the front end of which the part of the product caliber projecting beyond it is cut off as a slice by the blade directly in front of the cutting frame.

The slices generally fall onto a discharge conveyor of a discharge unit, by means of which they are transported away for further processing.

During slicing, the product calibers are usually held at their rear end facing away from the cutting frame by a gripper, which is equipped with corresponding gripper claws for this purpose.

For reloading the slicer with new product calibers, the feed conveyor can usually be tilted down from the inclined slicing position to a horizontal loading position for easier loading.

This can be done while the rest of the product calibers are still being cut, held by the grippers.

In most cases, all grippers are attached to a common gripper slide—with respect to which they can be partially moved a limited distance in the feeding direction—and this entire gripper slide is moved forward in the feeding direction along a gripper guide, together with the calibers held by it.

The slide drive is preferably arranged in a fixed position at the rear end of the slide guide and the drive force is transmitted to the gripper slide, for example by means of a sliding shaft, since otherwise, in the case of a slide drive directly on the slide, corresponding cables would have to be routed to the gripper slide, which can move over long distances, for the power supply.

For the same reason, the individual gripper drives for actuating the grippers, e.g., extending the gripper claws, are transmitted to the gripper slide from a fixed position on the slide guide via the sliding shaft, which makes it very difficult to control the individual grippers independently.

Another disadvantage is that the inclined backward and upward guide of the slide and the parallel sliding shaft result in a large overall height of the machine, which both complicates transport and limits its use in low halls.

SUMMARY

It is therefore the object according to the invention to provide a slicing machine, in particular a slicer, which facilitates the independent control of the individual grippers and keeps the overall height of the machine low.

With regard to the slicing machine and in particular its feed unit, the object is solved in that the gripper slide is attached to an intermediate traversing element which can also be moved in and against the feeding direction, but which travels a significantly shorter distance—in particular less than 60% —than the gripper slide itself in order to move the gripper slide, so that accordingly the gripper slide is also moved at a higher speed than the intermediate traversing element.

On the one hand, this allows the gripper slide to be moved very quickly, and on the other hand, the intermediate element only moves over a significantly shorter distance than the gripper slide.

Such an intermediate element usually comprises, on the one hand, a traversing base fixed to the base frame, relative to which it is moved, and, on the other hand, a fastening element to which the gripper slide is attached.

Different designs of such traversing intermediate elements are possible:

A first possibility is that the intermediate element is a traction element unit in which an circulating endless traction element, such as a toothed belt, circulates around two deflection drums or deflection rollers mounted in a traction element frame. The stationary traversing base comprises a drive roller for the traction element, which engages with one of the two strands of the traction element, so that when this strand is moved back and forth relative to the drive roller, the traction element frame is moved in and against the feeding direction relative to the traversing base and the drive roller there.

The fastening element for the gripper slide is attached to the other strand of the traction element.

If the traction element frame is moved relative to the drive roller in such a way that the drive roller is located first at one end and then at the other end of the traction element frame, the fastening element also moves relative to the traction element frame over approximately its length in the same direction, so that the fastening element travels approximately twice the distance relative to the traversing base as the traction element frame.

In addition, multi-stage traversing intermediate elements are also known.

In this case, a second traversing element is movable relative to a first traversing element and is usually also guided on the latter, and likewise a third traversing element can be movable relative to the second and is usually also guided on the latter, and so on, the fastening element for fastening the gripper slide being fastened to the last traversing element in the sequence described, while the first is operatively connected to the traversing base.

The relative movements between the individual traversing elements can be effected by circulating endless traction elements, toothed rack/pinion combinations or other drive elements. In such a multi-stage intermediate element, the traversing distance that can be traversed by the gripper slide is many times greater than the length of the intermediate element, especially when it is pushed together, and the individual traversing elements usually have the same length.

For stabilization purposes, the traversing element, in particular each traversing element, and also in the single-stage embodiment the single intermediate element, in particular the traversing element, is usually guided on its own traversing guide.

If necessary, it is then possible to dispense with a gripper guide for guiding the gripper slide.

Using the same guide for both the traversing elements and the gripper slide is generally not possible, since it must be possible for the corresponding elements to pass each other along the guide.

However, it is possible to form several guides on a guide body, one or some of which can be used as traversing guides and one as a slide guide.

Due to the intermediate element, the slide motor driving the gripper slide can be arranged stationary at the traversing base, so that the energy lines there does not cause any problems, and yet the transmission of the corresponding type of energy to the gripper slide or the individual grippers does not have to be carried out via an elaborate sliding shaft extending over a long distance, but always only along the relatively short lengths of the individual traversing elements, which, in addition, can be carried out encapsulated inside and is also easy to realize from a cleaning point of view.

The motor of the slide can even be mounted coaxially to the drive shaft of the slide drive, which results in a particularly simple design.

BRIEF DESCRIPTION OF THE DRAWINGS

Exemplary embodiments according to the invention are described in more detail below. They show.

DETAILED DESCRIPTION

Figure 1A:
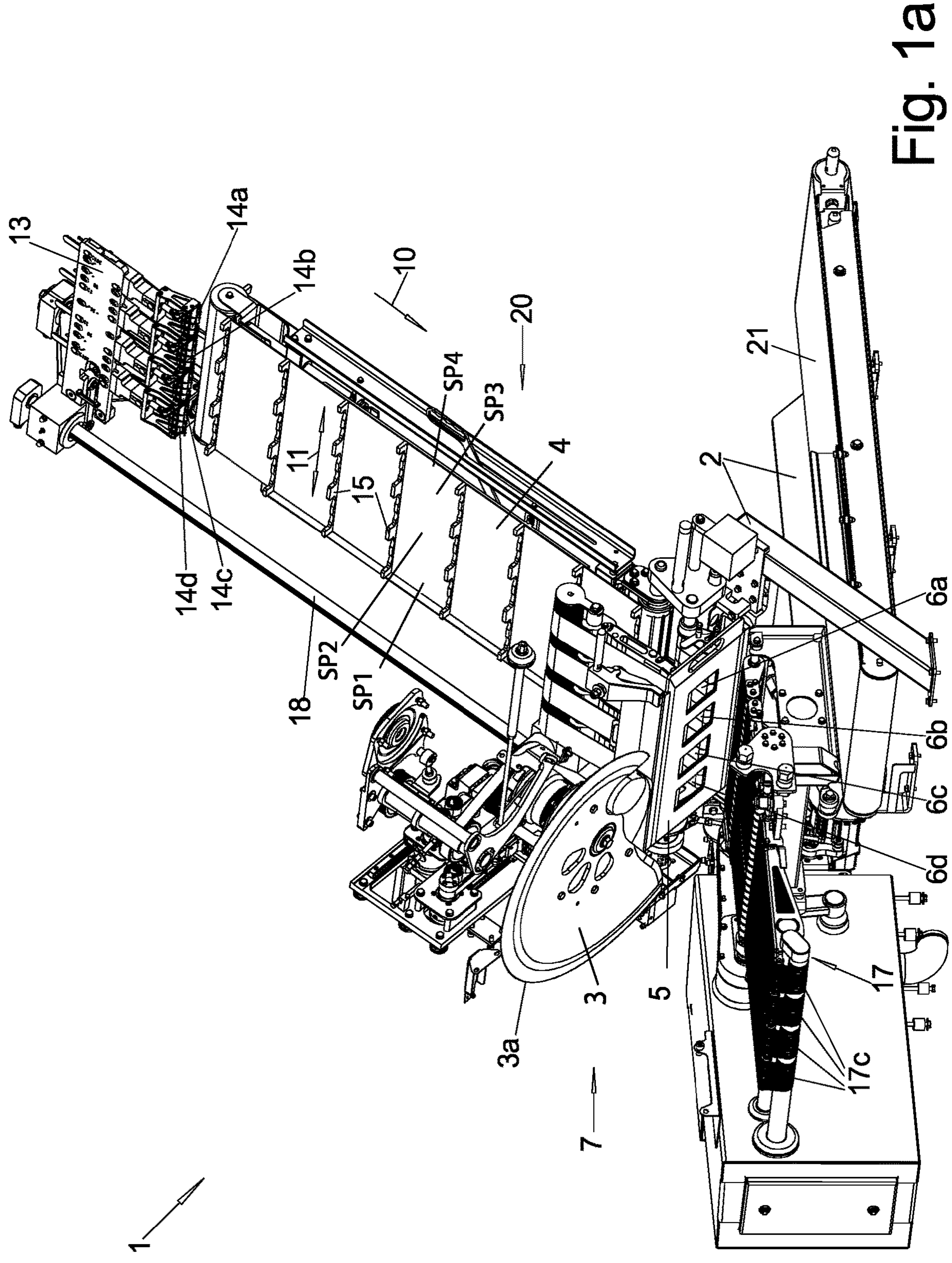
FIGS. 1*a, b*: a slicing machine in the form of a slicer according to the prior art in different perspective views, with the feed belt tilted up into the slicing position.
Figure 1B:
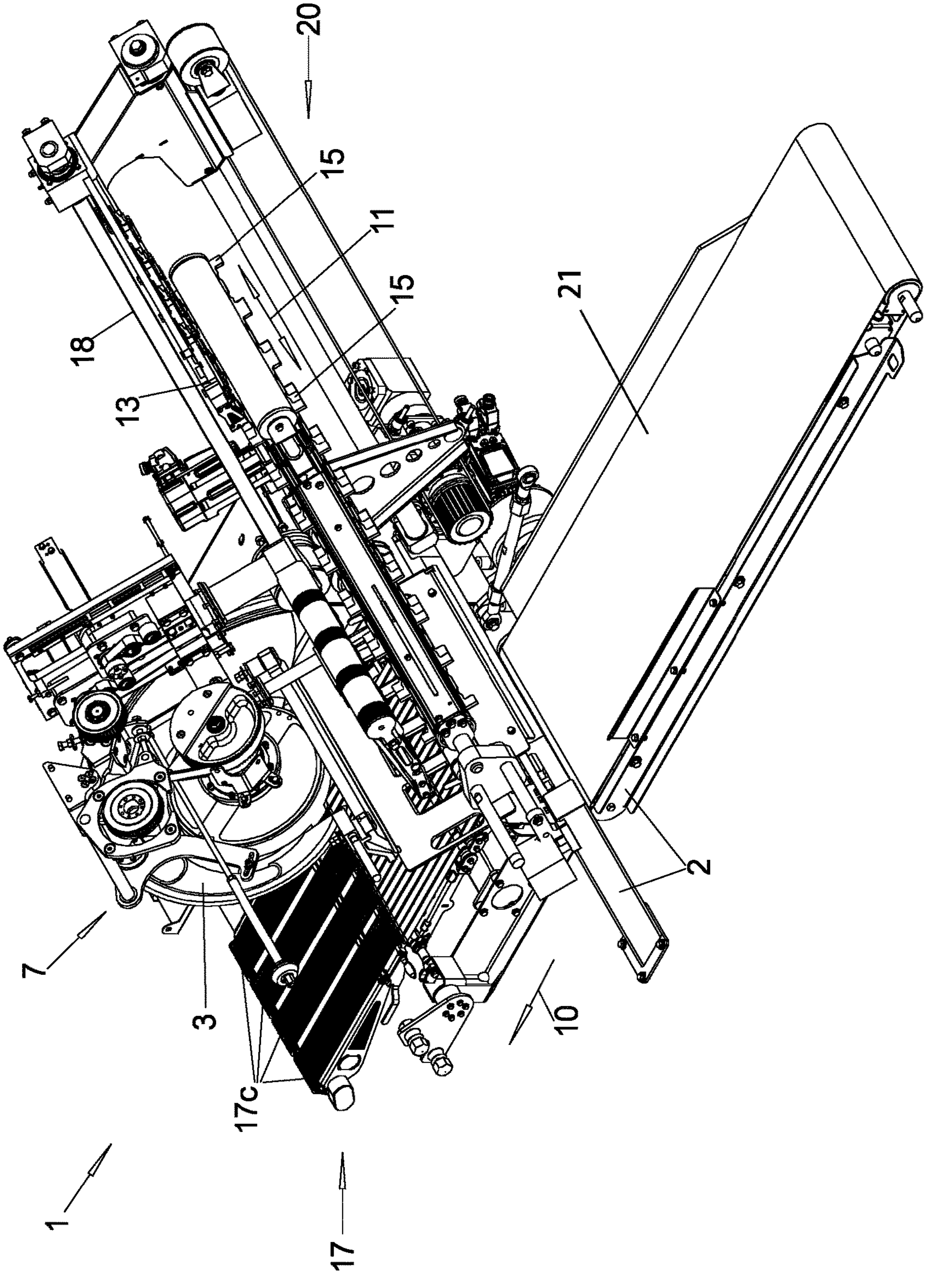
FIG. 1*c*: the slicing machine of FIGS. 1*a, b* in side view with cover parts removed so that the various conveyor belts can be seen more clearly.

FIGS. 1*a*, 1*b* show different perspective views of a multi-track slicer 1 for simultaneous slicing of several product calibers K on one track SP1 to SP4 next to each other and depositing in shingled portions P each consisting of several slices S with a general passage direction 10* through the slicer 1 from right to left.

Figure 1C:
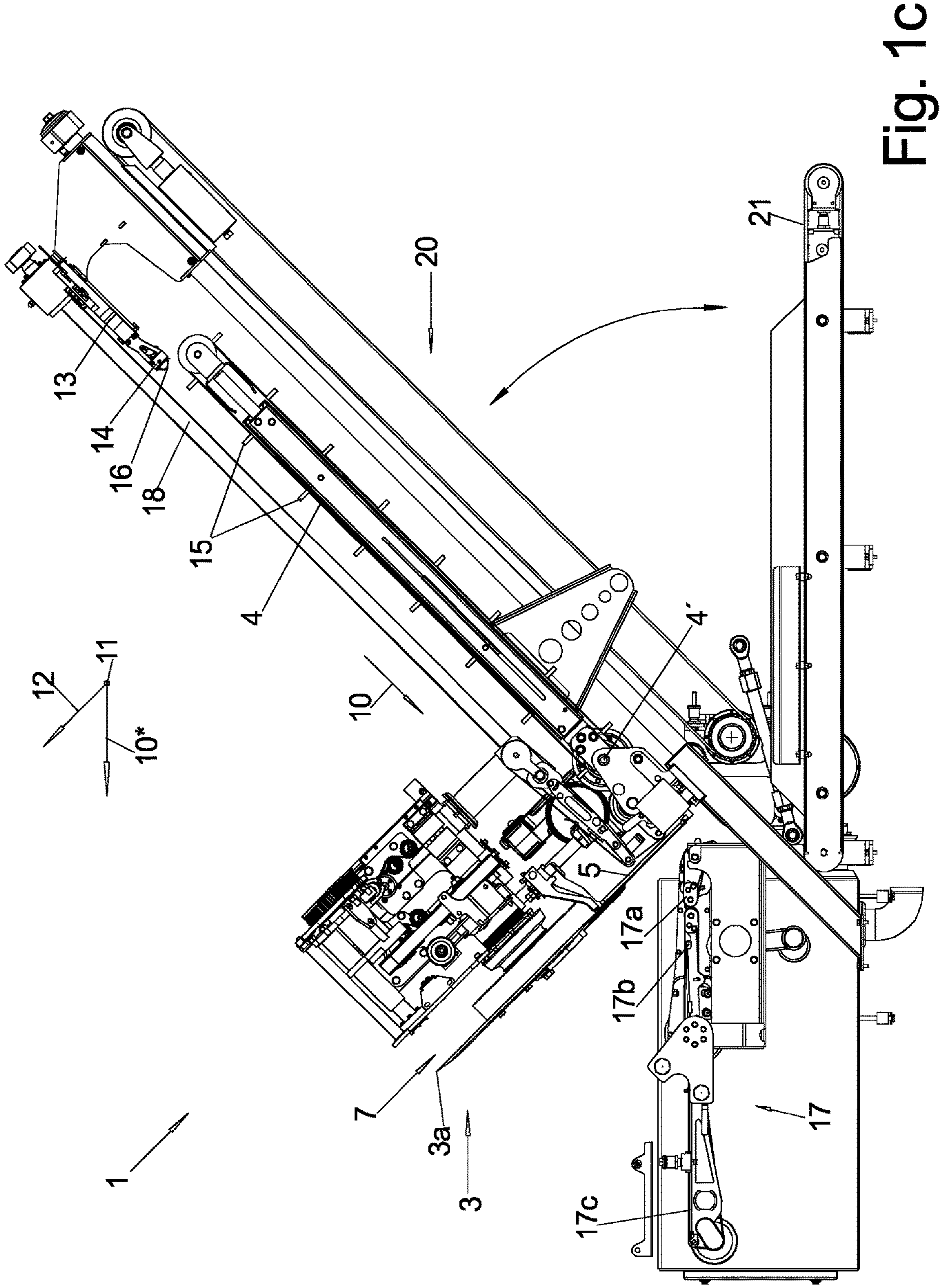
Figure 2A:
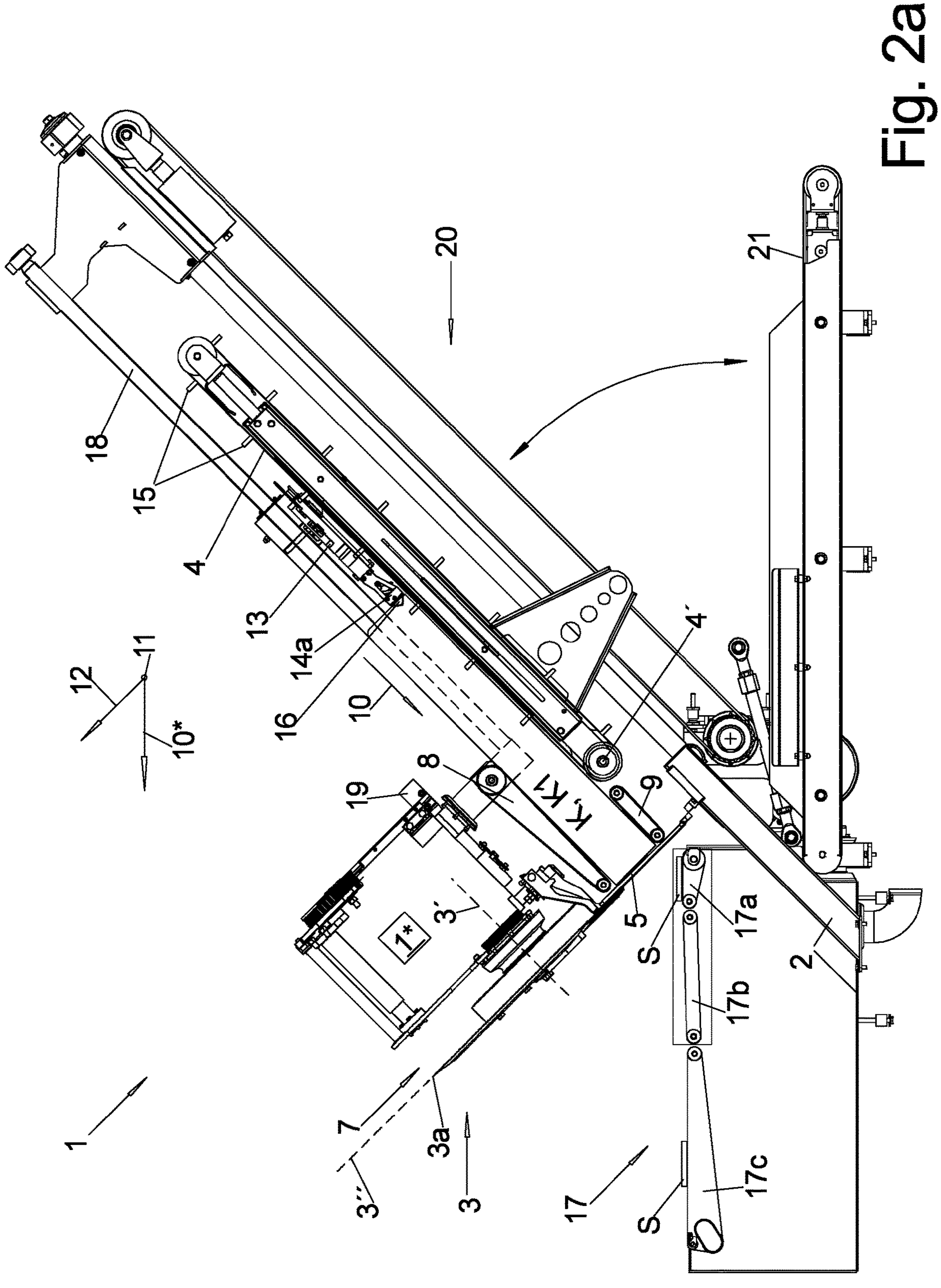
FIG. 2*a*: a simplified side view of the slicing machine compared to FIG. 1*c*, loaded with a product caliber.

FIG. 1*c* and FIG. 2*a* show—without and with the caliber K inserted—a side view of this slicer 1 omitting covers and other parts not relevant to the invention, which are attached to the base frame 2 as are all other units, so that the functional parts, especially the conveyor belts, can be seen more clearly. The longitudinal direction 10 is the feeding direction of the calibers K to the cutting unit 7, and thus also the longitudinal direction of the calibers K lying in the slicer 1.

It can be seen that the basic structure of a slicer 1 according to the state of the art is that a cutting unit 7 with blades 3 rotating about a blade axis 3', such as a sickle blade 3, has several, in this case four, product calibers K lying side by side transversely to the feeding direction 10 on a feed conveyor 4 with spacers 15 of the feed conveyor 4 between them are fed by this feed unit 20, from the front ends of which the rotating blade 3 cuts off a slice S with its cutting edge 3*a* in each case in one operation, i.e., almost simultaneously.

Figure 2B:
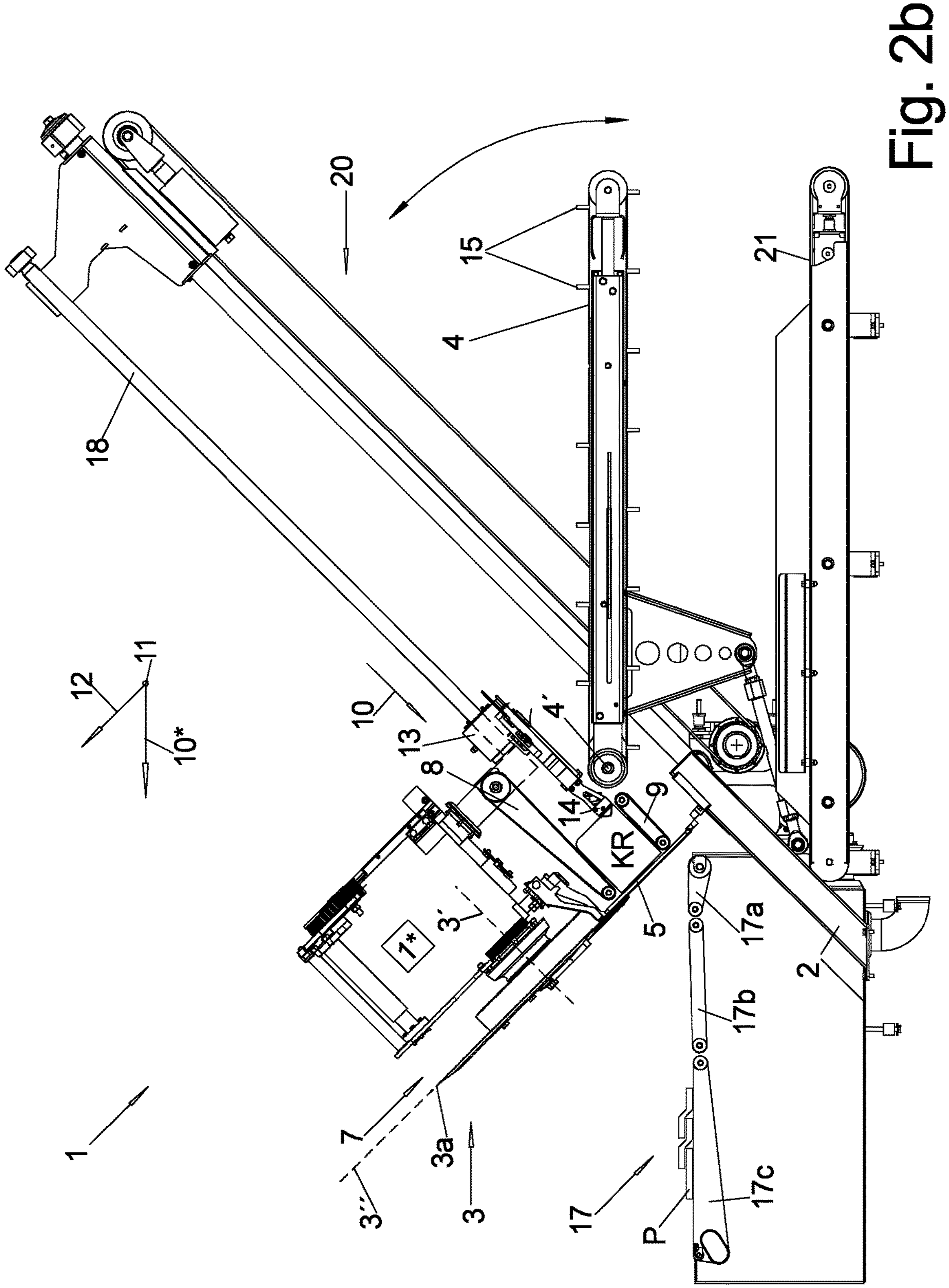
FIG. 2*b*: a side view as in FIG. 2*a*, but with the infeed belt tilted down to the loading position and the product caliber cut except for a caliber rest piece.

For slicing the product calibers K, the feed conveyor 4 is in the slicing position shown in FIGS. 1*a*-2*a*, which is oblique in side view with a low-lying cutting-side front end and a high-lying rear end, from which it can be tilted down about a pivot axis 4' running in its width direction, the first transverse direction 11, which is located in the vicinity of the cutting unit 7, into an approximately horizontal loading position as shown in FIG. 2*b*.

The rear end of each caliber K lying in the feed unit 20 is held positively by a gripper 14*a-d* with the aid of gripper claws 16 as shown in FIG. 2*a*. These grippers 14*a*-14*d*, which can be activated and deactivated with respect to the position of the gripper claws 16, are attached to a common gripper slide 13, which can be moved along a gripper guide 18 in the feeding direction 10.

Both the advance of the gripper slide 13 and of the feed conveyor 4 can be driven in a controlled manner, but the actual feed speed of the calibers K is effected by a so-called upper and lower product guide 8, 9, which are also driven in a controlled manner and which engage on the upper side and lower side of the calibers K to be cut in their front end regions near the cutting unit 7.

The front ends of the calibers K are each guided through a product opening 6*a-d* of a plate-shaped cutting frame 5, the cutting plane 3" running directly in front of the front, obliquely downward-pointing end face of the cutting frame 5, in which cutting plane the blade 3 rotates with its cutting edge 3*a* and thus cuts off the protrusion of the calibers K from the cutting frame 5 as a slice S. The cutting plane 3" runs perpendicular to the upper run of the feed conveyor 4 and/or is spanned by the two transverse directions 11, 12 to the feeding direction 10.

In this case, the inner circumference of the product openings 6*a-d* serves as a counter edge of the cutting edge 3*a* of the blade 3.

Since both product guides 8, 9 can be driven in a controlled manner, in particular independently of each other and/or possibly separately for each track SP1 to SP4, these determine the—continuous or clocked—feed speed of the calibers K through the cutting frame 5.

The upper product guide 8 is displaceable in the second transverse direction 12—which is perpendicular to the surface of the upper strand of the infeed conveyor 4—for adaptation to the height of the caliber K in this direction. Furthermore, at least one of the product guides 8, 9 can be embodied to be pivotable about one of its deflection rollers in order to be able to change the direction of the strand of its guide belt resting against the caliber K to a limited extent.

The slices S standing obliquely in space during separation fall onto a discharge unit 17 which begins below the cutting frame 5 and runs in the passage direction 10* and which in this case consists of a plurality of discharge conveyors 17*a*,

*b*, *c* arranged one behind the other with their upper runs approximately aligned in the passage direction 10*, of which the first discharge conveyor 17*a* in the passage direction 10 can be embodied as a portioning belt 17*a* and/or one can also be embodied as a weighing unit.

The slices S can hit the discharge conveyor 17 individually and spaced apart from each other in the passage direction 10* or, by appropriate control of the portioning belt 17*a* of the discharge unit 17—the movement of which, like almost all moving parts, is controlled by the control 1*—form shingled or stacked portions P, by stepwise forward movement of the portioning belt 17*a*.

Below the feed unit 20 there is usually an approximately horizontally running rest piece conveyor 21, which starts with its front end below the cutting frame 5 and directly below or behind the discharge unit 17 and with its upper run thereon—by means of the drive of one of the discharge conveyors 17 against the passage direction 10—transports falling rest piece to the rear.

The traversing unit 24 shown in FIGS. 3*a-c*, where it serves as the slide drive, will first be explained in terms of its function on the basis of the enlarged individual representation in FIG. 4*a*.

In this case, the traversing unit 24 is a traction element unit 24 with an endless traction element 28, such as a belt or several parallel belts, circulating over two deflection rollers 28.1, 28.2. The two deflection rollers 28.1, 28.2 are held at a distance by a traction element frame 29 in which they are supported.

At a position of one strand of the circulating traction element 28 here the lower strand, a drive roller 28.3 is provided which is in engagement with the traction element 28 and can be driven in a controlled manner by a motor, here the slide motor M23, arranged coaxially thereto in this case, and can thereby drive the traction element 28 in a controlled manner.

In this case, the drive roller 28.3 is preferably arranged at a greater distance from the traction element frame 29 than the upper strand or lower strand running along the latter, and for deflection towards the drive roller 28.3, a branch roller 28.4, 28.5 is arranged downstream and upstream thereof in each case, over which the corresponding strand is likewise guided, so that the lower strand here of the traction element 28 forms an (2-shaped loop in which the drive roller 28.3 is arranged.

Since the traversing base 24*a* consisting of the two branch rollers 28.4 and 28.5 as well as the drive roller 28.3 is mounted in a stationary manner, when the traction element 28 is driven not only the traction element moves through the (2-shaped loop, but in addition the traction element frame 29 moves in or against the feeding direction 10, i.e., the longitudinal extension of the traction element frame 29 considered in this side view.

The gripper slide 13, which is firmly connected by means of indicated fastening elements 24*c* to the strand opposite the traversing base 24*a*, here the upper strand, of the traction element 28, is moved in this way at twice the speed 2*v* in the feeding direction 10 compared to the feed speed v of the traction element frame 29.

Figure 3A:
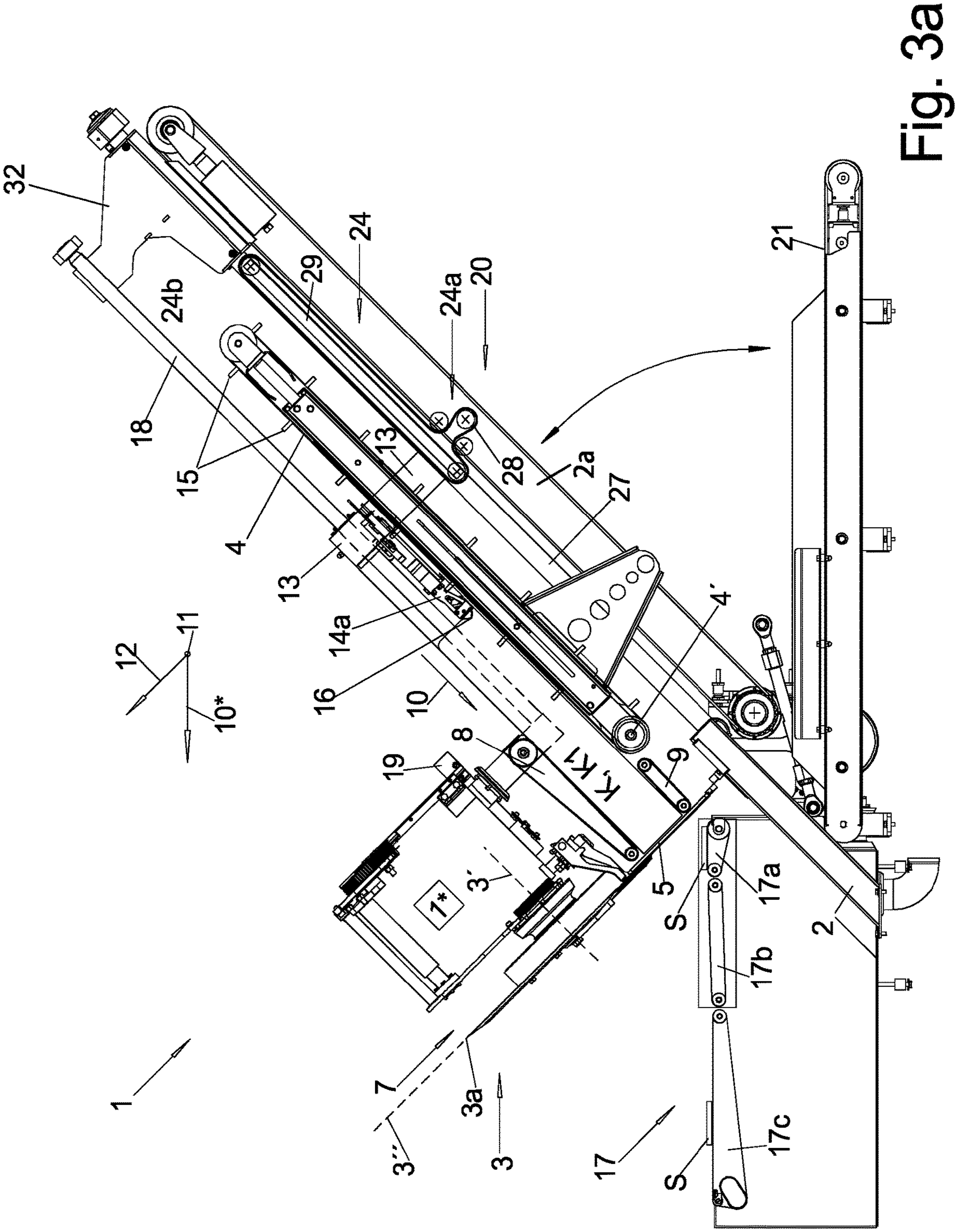
FIG. 3*a*: a side view according to FIG. 2*a* with a traversing unit as slide drive in a first functional position.

In FIG. 3*a*, such a traversing unit 24 is attached as a slide drive with the traversing base 24*a* to a strut 2*a* of the base frame 2 of the machine 1 extending in the feeding direction 10, i.e., obliquely, and can be moved by the latter in or against the feeding direction 10.

The traction element frame 29 is guided along a traversing guide 27, which also runs in the feeding direction 10 and is arranged stationary with respect to the base frame 2.

Figure 3B:
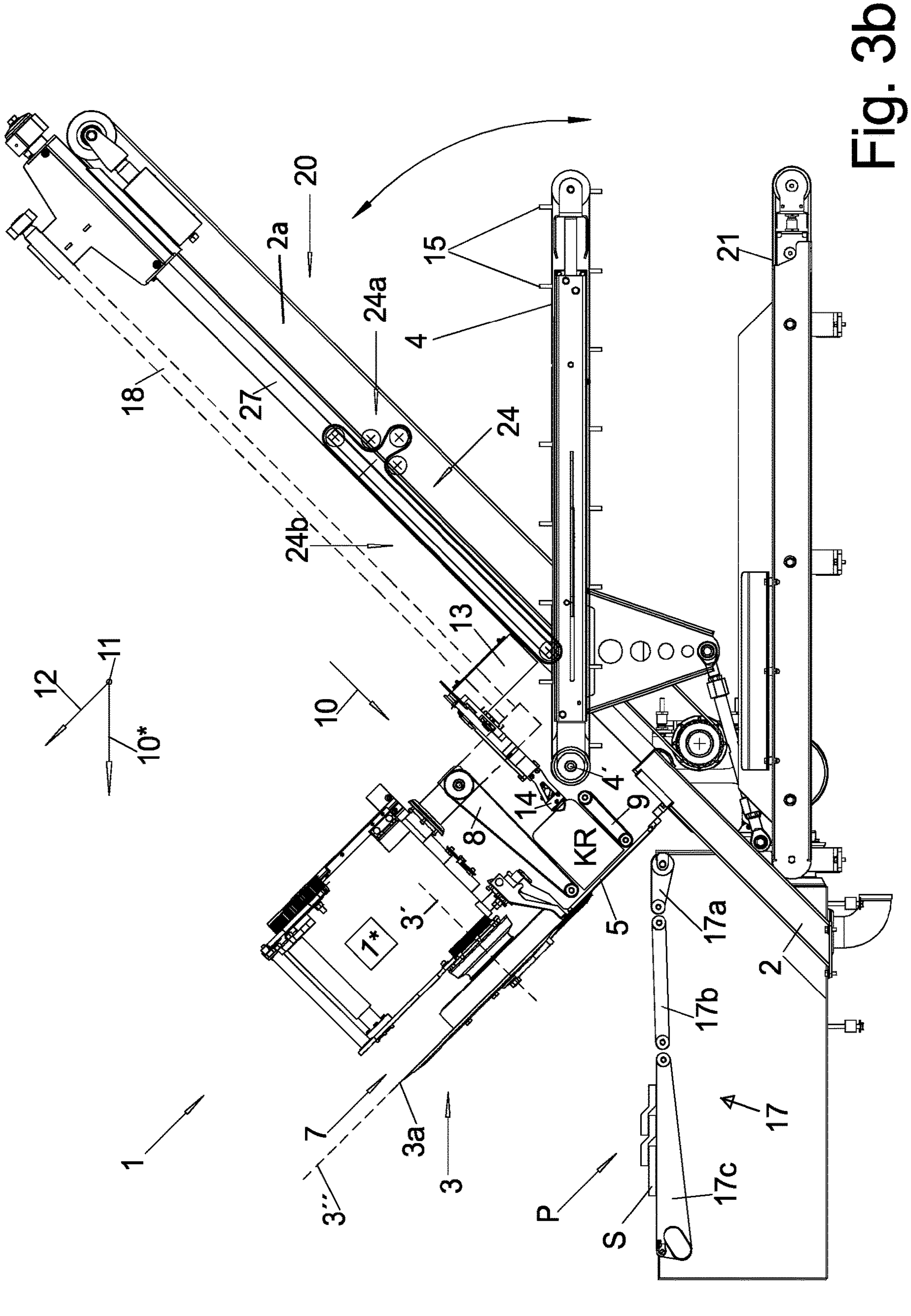
FIG. 3*b*: a side view according to FIG. 2*b* with a traversing unit as slide drive in a second functional position.

FIG. 3*a* also shows that the gripper slide 13 is additionally guided along a slide guide 18—which also runs in the feeding direction 10—but this is not absolutely necessary if the gripper slide 13 is fastened to the traversing unit 24 in a suitably stable manner, as indicated by FIG. 3*b*, in which this slide guide 18 is only shown as an option. In the embodiment shown in FIG. 3*a*, the slide guide 18 and the traversing guide 27 are formed on a guide body 32 having multiple guides, wherein one of the multiple guides is used as the slide guide 18 and another of the multiple guides is used as the traversing guide 27.

Since in FIG. 3*a* the caliber K to be sliced, here in the case of the multi-track machine the caliber K1 on the visible first track SP1, is still almost complete, the traction element frame 29 is almost completely displaced upwards to the right relative to the traversing base 24*a*, and the gripper slide 13 is attached to the traction element 28 and is located near the rear upper end of the traction element frame 29.

In FIG. 3*b*, on the other hand, only a caliber rest piece KR of the caliber is left, and the traction element frame 29 has moved almost completely downward to the left relative to the traversing base 24*a*, and the gripper slide 13 attached to the traction element 28 is located near the front lower end of the traction element frame 29, so that the gripper 14 can still hold the caliber rest piece KR.

Figure 3C:
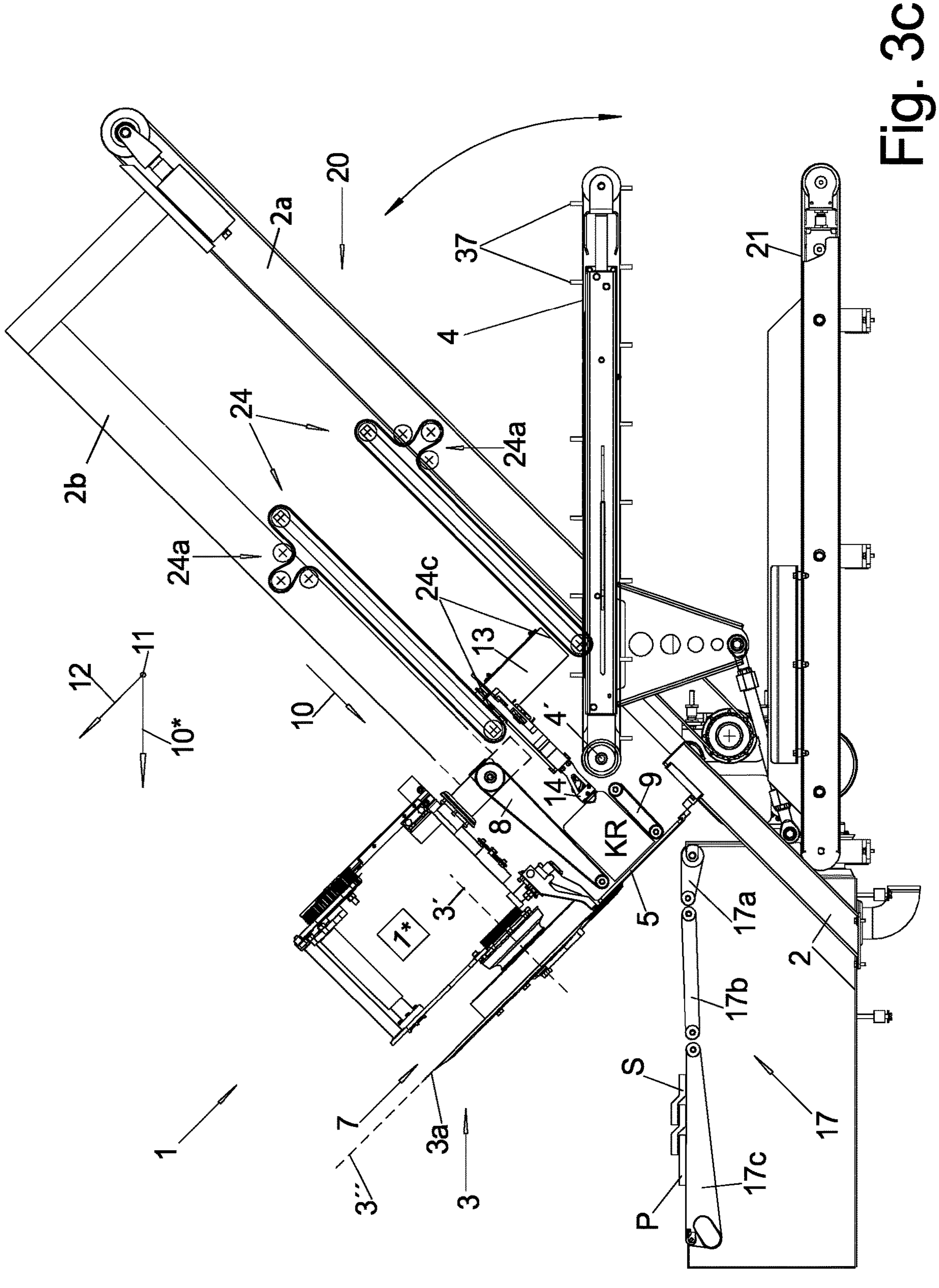
FIG. 3*c*: a representation according to FIG. 2*b* with two synchronously driven traversing units as slide drive.

FIG. 3*c* shows—also with only the caliber rest piece KR still present as in FIG. 3*b*—a solution in which above and below the gripper slide 13 there is in each case a traversing unit 24, which are driven synchronously in or against the feeding direction 10, since the gripper slide 13 is fastened both at its upper and at its lower end by fastening elements 24*c* to both traversing units 24.

For this purpose, the base frame 2 has above and below the path of movement of the gripper slide 13 two respective struts 2*a*, 2*b* extending in the feeding direction 10, to each of which one of the traversing units 24 is fastened by its traversing base 24*a*.

In the case of the upper traversing unit 24, in contrast to the lower traversing unit 24, the gripper slide 13 is attached to the lower run and the (2-shaped drive loop is formed in the upper strand of the traction element 28.

However, there are other embodiments of traversing units 24 that solves the same object.

Figure 4A:
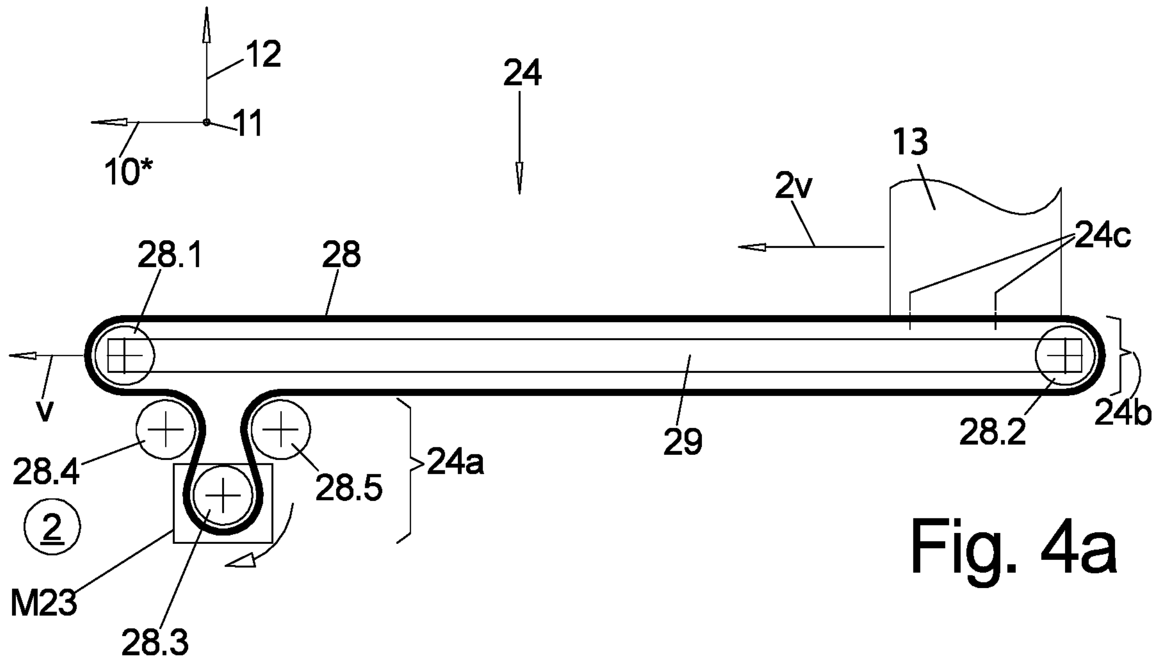
FIG. 4*a*: the traversing unit shown in FIGS. 3*a-c* in enlarged individual representation.
Figure 4B:
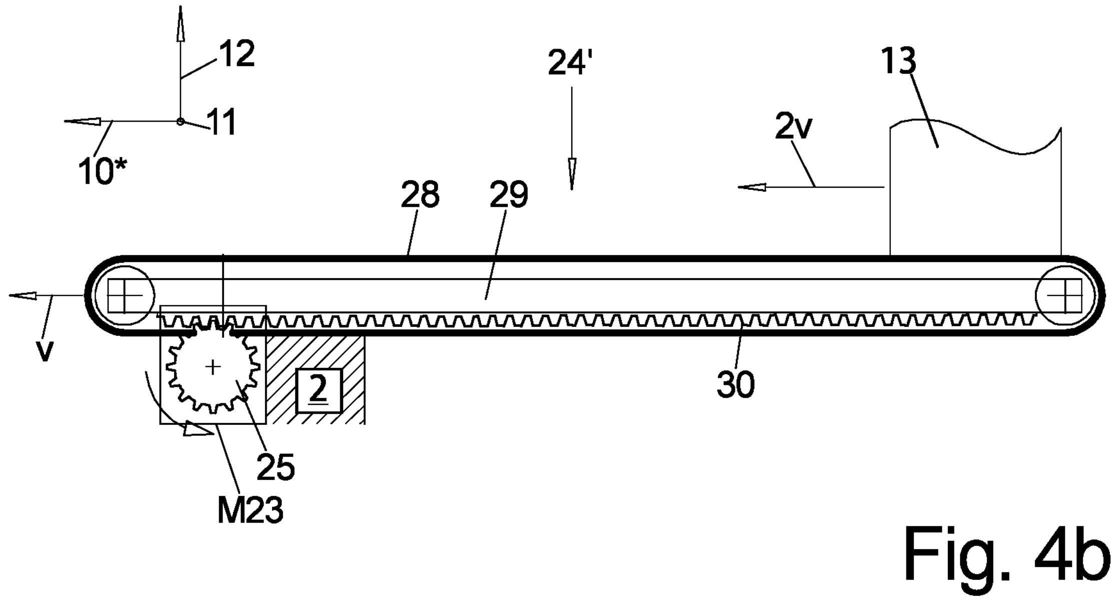
FIG. 4*b*: an alternative embodiment of a traversing unit in enlarged individual representation.

For example, FIG. 4*b* alternatively shows another embodiment 24' in which, unlike the embodiment of FIG. 4*a*, a toothed rack 30 extending in the feeding direction 10 is formed on the traction element frame 29, with which a pinion 25 driven by the slide motor M23 is engaged and through this, in a manner analogous to FIG. 4*a*, the traction element 28 and thus also the traction element frame 29 are moved, and thus also the gripper slide 13, which is in turn attached to the traction element 28, with twice the travel speed 2*v* compared to the movement speed v of the traction element frame 29.

Figure 5:
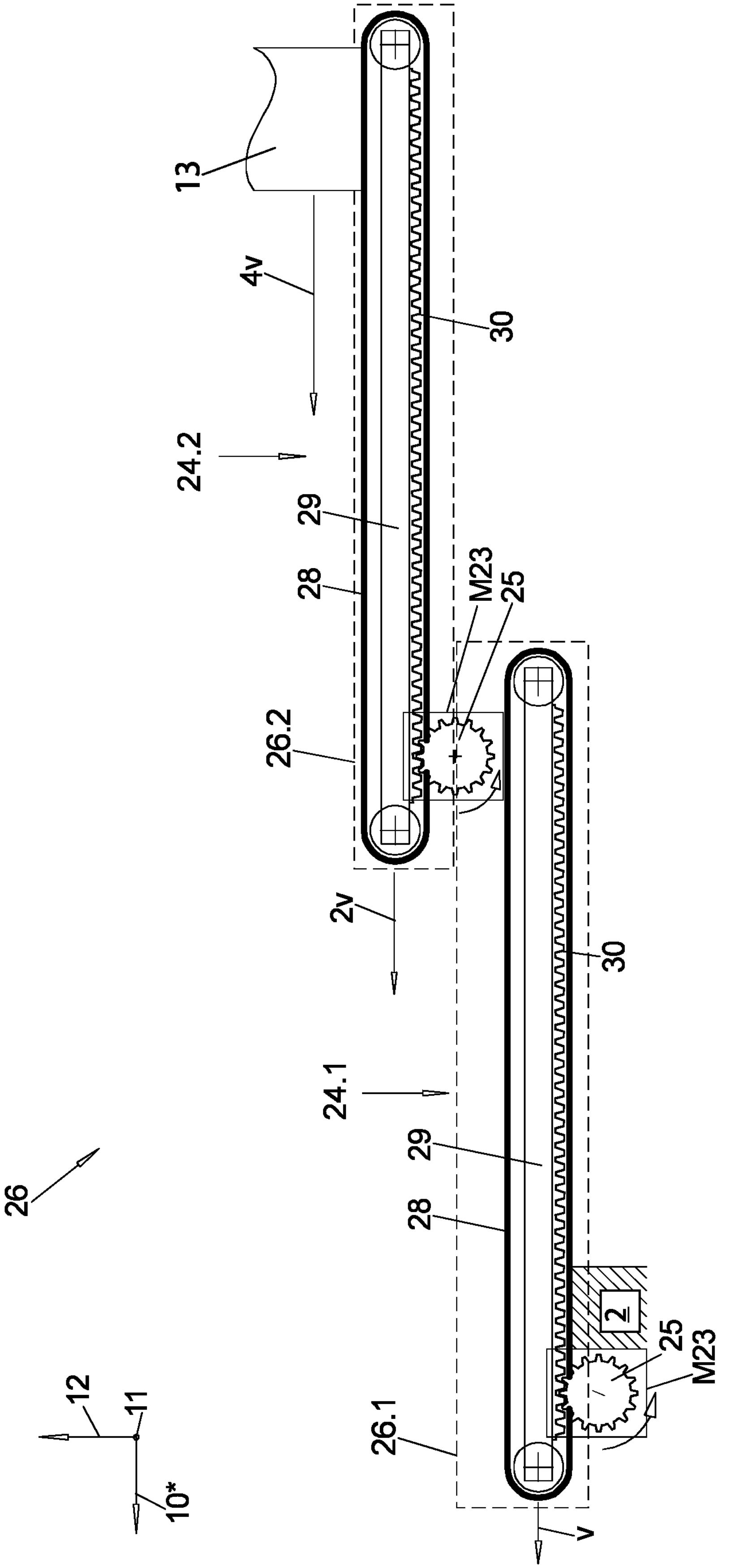
FIG. 5: a two-stage traversing unit.

FIG. 5 shows a two-stage traversing unit based on the embodiment of FIG. 4*b*.

The gripper slide 13 is not directly attached to one run, here again the upper strand, of the traction element 28 of the first traversing unit 24.1, but instead the traversing base 24*a* of a second traversing unit 24.2, and the gripper slide 13 is only attached to its upper strand.

The transmission ratio thus obtained has the factor of about 4, with which the gripper slide 13 moves relative to the speed of movement of the traction element frame 29 of the first traversing unit 24.1.

As indicated, the two traversing units 24.1, 24.2 may each be arranged in a telescopic rod 26.1, 26.2 of a telescopic unit 26, the telescopic rods 26.1, 26.2 preferably consisting of a hollow section or of a tube and thereby protecting the traversing unit 24, and being guided together in the feeding direction 10.

REFERENCE LIST 1 slicing machine, slicer
1* control
2 base frame
2a, b strut
3 blade
3 rotation axis
3" blade plane, cutting plane
3a cutting edge
4 feed conveyor, feed belt
5 cutting frame
6a-d product opening
7 cutting unit
8 upper product guide, upper guide belt
8.1 contact run, lower run
8a cutting side deflection roller
8b deflection roller facing away from the cutting side
9 bottom product guide, lower guide belt
8.1 contact run, upper run
9a cutting side deflection roller
9b deflection roller facing away from the cutting side
10 transport direction, feeding direction
10* pass through direction
11 1. transverse direction (width slicer)
12 2. transverse direction (height-direction caliber)
13 gripper unit, gripper slide
14,14a-d gripper
15 spacer
16 gripper claw
17 discharge conveyor unit
17a, b, c portioning belt, discharge conveyor
18 slide guide
19 height sensor
20 feed unit
21 end piece conveyor
22 end piece container
24 traversing unit, traction element unit
24a traversing base
24b traversing element
24c fastening element
25 pinion
26 telescopic unit
26.1, 26.2 telescopic rods
27 traversing guide
28 traction element
28.1, 28.2 deflection roller
28.3 drive roller
28.4, 28.5 branch roller
29 traction element frame
30 toothed rack
K product, product caliber
KR end piece
M23 slide motor
S slice
P portion

The invention claimed is:

1. A slicing machine for slicing product calibers into slices and producing shingled or stacked portions from the slices, comprising:
a base frame,
a cutting unit,
a feed unit for feeding at least one of the calibers to the cutting unit comprising:
at least one gripper for gripping, holding and moving a rear end of the at least one of the calibers,
a gripper slide carrying the at least one gripper and movable in or against a feeding direction, and
a slide drive for controlled driving of the gripper slide in and against the feeding direction, and
a discharge unit for conveying the slices away from the cutting unit, wherein the slide drive comprises a multi-stage traversing unit, the multi-stage traversing unit including a first traversing unit configured to traverse at least partially in and against the feeding direction and at least one additional traversing unit configured to traverse with respect to the first traversing unit, and the multi-stage traversing unit further including a traversing base operatively connected to the first traversing unit, wherein the gripper slide is attached to the first traversing unit and is operatively connected to a last traversing unit of the at least one additional traversing unit, and wherein a maximum travel of the first traversing unit is less than a travel of the gripper slide effected by the first traversing unit, such that, upon movement of the first traversing unit, the gripper slide is moved at a higher speed than the first traversing unit.

2. The slicing machine according to claim 1, wherein
the first traversing unit and the at least one additional traversing unit are telescopic rods of a telescopic unit, wherein the first traversing unit and the at least one additional traversing unit are movable relative to one another and are guidable against one another,
in at least one of the telescopic rods there is a circulatable endless traction element, wherein the circulatable endless traction element is operatively connected to another of the telescopic rods.

3. The slicing machine according to claim 1, wherein each of the first traversing unit and the at least one additional traversing unit is guided on a traversing guide.

4. A slicing machine for slicing product calibers into slices and producing shingled or stacked portions from the slices, comprising:
a base frame;
a cutting unit;
a feed unit for feeding at least one of the calibers to the cutting unit comprising:
at least one gripper for gripping, holding and moving a rear end of the at least one of the calibers;
a gripper slide carrying the at least one gripper and movable in or against a feeding direction; and
a slide drive for controlled driving of the gripper slide in and against the feeding direction; and
a discharge unit for conveying the slices away from the cutting unit;
wherein the slide drive comprises a first traversing unit configured to traverse at least partially in and against the feeding direction, wherein the gripper slide is attached to the first traversing unit, wherein a maximum travel of the first traversing unit is less than a travel of the gripper slide effected by the first traversing unit such that, upon movement of the first traversing unit, the gripper slide is moved at a higher speed than the first traversing unit, wherein a slide motor for driving the gripper slide is stationarily arranged on the first traversing unit and/or the base frame, and wherein the slide motor is arranged coaxially to a drive shaft of the first traversing unit.

* * * * *